United States Patent [19]

Robinson

[11] 4,071,038

[45] Jan. 31, 1978

[54] FAILSAFE FLUID CONTROL VALVE

[76] Inventor: Dale D. Robinson, 225 Smith Road, Spring Valley, N.Y. 10977

[21] Appl. No.: 728,507

[22] Filed: Oct. 1, 1976

[51] Int. Cl.² .................................................. F16K 17/28
[52] U.S. Cl. ........................................ 137/59; 137/460; 137/462; 137/519.5; 137/599.2; 137/624.13
[58] Field of Search .............. 137/59, 460, 462, 498, 137/519.5, 599.2, 624.13

[56] References Cited

U.S. PATENT DOCUMENTS

| 706,573 | 3/1902 | Lindsay | 137/599.2 |
| 1,491,241 | 4/1924 | Kindervator | 137/460 |
| 3,376,893 | 4/1968 | McCombs | 137/599.2 |

*Primary Examiner*—Robert G. Nilson
*Attorney, Agent, or Firm*—Kirschstein, Kirschstein, Ottinger, Frank, & Cobrin

[57] ABSTRACT

A displaceable frusto-conical channel is provided typically axially in-line in a housing, the housing being interposed in a fluid supply pipe, e.g. a water supply line. The truncated smaller end of the channel is downstream in terms of fluid flow. A ball is disposed in the channel so that a surge or high flow of fluid will move the ball downstream within the hollow channel until the ball constricts and stops fluid flow by contact with the inner wall of the channel. To complete the device, the upstream end of the channel is spring-loaded and a rod acts against the downstream end of the channel, typically in conjunction with a timer. When the timer is set, the rod holds the channel away from the tapered internal surface of the housing, to permit continuous fluid flow. At a predetermined time, the rod is withdrawn and the spring moves the channel against the inner surface of the housing, so that fluid flow may be completely blocked by the ball if the flow becomes excessive, or in an alternative case, if any flow at all takes place. When the timer is reset, the ball moves, under the influence of gravity, away from the smaller downstream end of the channel and further fluid flow is permitted. When the device is applied in new home construction, i.e. where heat may not be constantly available and yet the house pipes may contain water, the rod may be provided with a freeze-out spacer so that if the heat fails, the system acts in the same manner as described above, i.e. the channel is moved by the spring and the water flow is blocked by the ball.

9 Claims, 4 Drawing Figures

FAILSAFE FLUID CONTROL VALVE

BACKGROUND OF THE INVENTION

1. Field of the Invention

Improved pressure-responsive valve which is particularly adapted for use in new home construction wherein it is necessary to turn the water control valve to an "on" position to test the water pipes for leaks and to leave the water system under pressure for a substantial period of time.

2. Description of the Prior Art

Pressure-responsive valves have been used for many years in many different situations. A typical prior art pressure-responsive valve includes a ball which allows flow through a pipe in one direction but not in a second and opposite direction. A further type of pressure-responsive valve includes a ball which is spring-loaded and controls flow through a pipe. More specifically, when the pressure in the pipe is below a predetermined value, the ball allows flow through the pipe. However, when the pressure in the pipe is above the predetermined value, the ball overcomes the bias of the spring, thereby moving to a position which shuts the flow of fluid through the pipe.

In constructing new homes it is necessary to turn the water control valve to an "on" position to test the water pipes for leaks. Normally, once the water control valve is turned to an "on" position the water in the pipe is maintained under pressure for a substantial period of time. During this substantial period of time the dwelling is unoccupied. It is important that when the dwelling is unoccupied the chance of damage to the dwelling due to a leakage or breakage in the water pipes be minimized for obvious reasons.

Typical prior art patents include U.S. Pat. Nos. 3,466,819; 3,407,827; 3,211,173; and 1,491,241.

SUMMARY OF THE INVENTION

Purposes of the Invention

It is an object of the present invention to provide an improved pressure-responsive valve.

It is a still further object of the present invention to provide an improved pressure-responsive valve which allows flow through a pipe when pressure in the pipe is below a predetermined value and which prevents flow through the pipe when the pressure therein is above a predetermined value.

A further object of the present invention is to provide an improved pressure-responsive valve which allows the flow of a fluid through a pipe when the pressure in said pipe is below a predetermined value, prevents the flow of fluid through said pipe when the pressure therein is above the predetermined value and which includes a release means whereby when the pressure in said pipe is above the predetermined value fluid may still flow through said pipe.

Yet a further object of the present invention is to provide an improved pressure-responsive valve which allows the flow of fluid through a pipe when the pressure in said pipe is below a predetermined value, and prevents the flow of fluid through said pipe when the pressure is above a predetermined value and which allows flow through said pipe irrespective of the pressure therein at designated pre-selected periods of time.

Another object of the present invention is to provide an improved pressure-responsive valve which can be used in a new dwelling construction where it is necessary to turn the water control valve to an "on" position to test the water pipes for leaks and leave the water control valve in said "on" position for long periods of time with said pressure-responsive valve preventing flow through the water pipes should said water pipes break.

Yet another object of the present invention is to provide an improved pressure-responsive valve capable of achieving the above and other objects and which is economical to manufacture and reliable in operation.

Other objects of the invention, in part, will be obvious and, in part, will be pointed out hereinafter.

Brief Description of the Invention

According to the present invention the foregoing as well as other objects which will be readily apparent to those having ordinary skill in the art are accomplished by a pressure-responsive flow control valve which is interposed in a conduit. The pressure-responsive flow control valve includes a housing having an elongated opening which extends therethrough and which comprises a first section and a second section. The second section of said elongated opening is of constant cross-sectional area, while the first section is adjacent to said second section and flares outwardly and away therefrom. Said second section of said elongated opening is in communication with a discharge port. Said first section is in communication with an inlet port.

Located partially in said first section and extending into an adjacent valve housing is a conically shaped valve element which moves longitudinally with respect to said first and second sections. Said conically shaped valve element includes a longitudinal passage extending therethrough with a ball movable in said longitudinal passage relative to said conically shaped valve element. Means are provided for preventing said ball from travelling past the extremes of said longitudinal passage in said conically shaped valve element. A spring biases said conically shaped valve element to a position whereby said conically shaped valve element seats in said first passage thereby preventing the flow of fluid about the periphery of said conically shaped valve element. Attached to the small end of said conically shaped valve element is a flow conduit which has a port extending therethrough which is in continuous communication with said discharge port. Attached to said flow conduit is a rod which can be actuated manually or mechanically to control the position of said conically shaped valve element.

In normal use, the spring bias causes the conically shaped valve element to seat on the inside surface of said first section of said valve housing. Fluid under pressure flows from the inlet port through said longitudinal channel and said conically shaped valve element about said ball through said port in said flow conduit and through said discharge port. As the pressure of the fluid increases, the ball moves along the channel in the conically shaped valve element until it reaches the extremity of said channel closest to the small section of said conically shaped valve element thereby seating against a seal and preventing the flow of fluid through said channel. If it is desired to allow fluid to flow through said valve, force is applied to said rod moving said conically shaped valve element away from said first section thereby presenting a flow path about said conically shaped valve element to said second port. If desired, a timer can be attached to the rod to periodically move said rod thereby allowing flow to periodically take place through said valve.

The valve arrangement just described is particularly suited for use in the construction of new dwellings. The invention accordingly consists of the features of construction, combination of elements and arrangement of parts which will be exemplified in the valve hereinafter described and of which the scope and application will be indicated in the appended claims.

DESCRIPTION OF THE PREFERRED EMBODIMENTS

Figure 1:
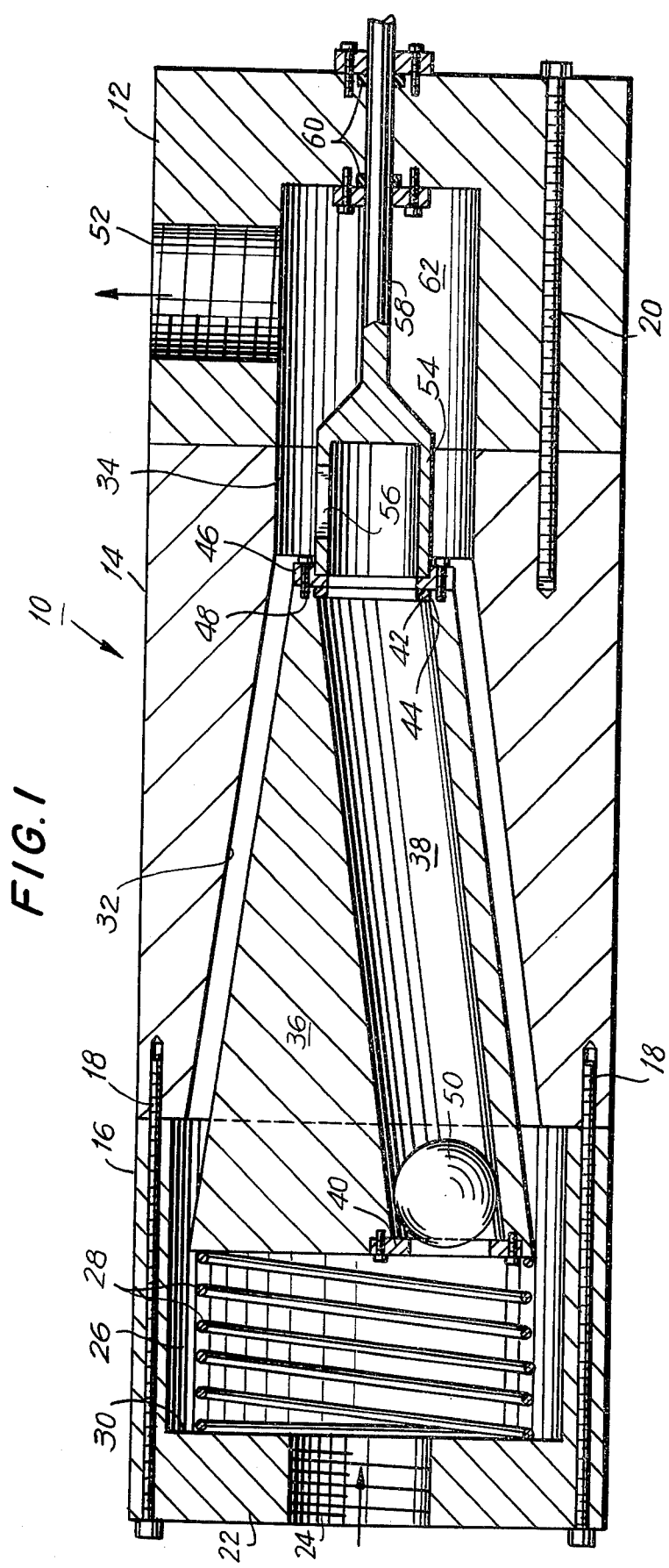
FIG. 1 is a sectional view showing a valve according to the present invention.

In the drawings a valve housing 10 is shown and includes sections 12, 14 and 16. Section 14 is intermediate sections 12 and 16. Bolts 18 affix section 16 to section 14, while bolts, one of which is shown in the drawings and identified by reference numeral 20, affix section 12 to section 14.

A valve housing face 22 includes a central inlet port 24 through which fluid is adapted to flow. Central inlet port 24 is threaded and a threaded male coupling may be attached thereto. Located within valve housing section 16 is a chamber 26 which is in communication with inlet port 24. Located within chamber 26 is a compression spring 28. One end of compression spring 28 bears against the inside surface 30 of valve housing face 22. It is to be appreciated that chamber 26 is of constant cross-sectional area throughout its length and extends from surface 30 of valve housing face 22 to the opposite end of said section. Valve housing section 14 includes a first section 32 and a second section 34. Second section 34 is of constant diameter cross-section and extends to first section 32 which flares outwardly and away from second section 34.

Located partially within chamber 26 and partially within first section 32 is a conically shaped valve element 36 which, as the name implies, has a conical shape. Extending through conically shaped valve element 36 is a longitudinal passage 38 with one end of said longitudinal passage being defined by a seat 40 and the remaining end by an O-ring 42. O-ring 42 sits in a groove 44 and abuts against an annular disc 46 which is bolted by bolts 48 to conically shaped valve element 36.

Located within longitudinal passage 38 is a ball 50 which can abut seat 40 or O-ring 42. Ball 50 has a slightly smaller cross-sectional area than the cross-sectional area of longitudinal passage 38 whereby fluid can flow about ball 50 except when said ball abuts O-ring 42 thereby creating a fluid seal.

Referring now to section 12, which is the fluid outlet section of the valve, a threaded lateral fluid outlet port 52 is provided. Fluid such as water reaches outlet port 52 by way of chamber 54 having a lateral port 56. Chamber 54 is mounted on the inner end of rod 58, which extends outwards through section 12 via stuffing boxes 60 which are provided to permit movement of rod 58 while preventing leakage of fluid external to the valve.

FIG. 1 shows the valve in the open by-pass position with fluid flow taking place, i.e. rod 58 is fully extended into the valve and has moved element 36 laterally so that spring 28 is compressed and by-pass fluid flow takes place in the annular passage between elements 36 and 32. In FIG. 1 the ball 50 is disposed at the base of passage 38 so that additional fluid flow takes place through passage 38, chamber 54 and port 56 to outlet port 52 via chamber 62 in section 12.

Figure 2:
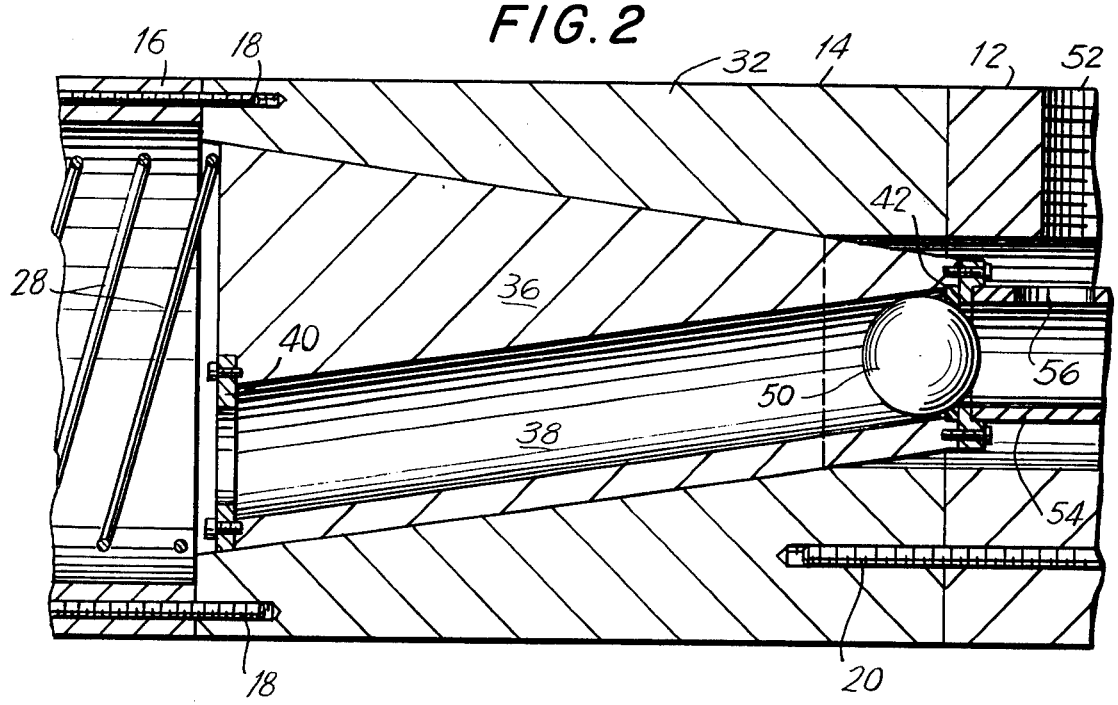
FIG. 2 is an enlarged sectional view of the valve structure shown in FIG. 1 wherein the conically shaped valve element is seated on a portion of the valve housing.

FIG. 2 shows the valve in the closed position with fluid flow being prevented; i.e., rod 58 is retracted and spring 28 has expanded and moved element 36 laterally so that elements 36 and 32 are contiguous and the annular passage between these elements is closed. In addition, in FIG. 2 differential fluid pressure has moved the ball 50 upwards through passage 38 so that ball 50 has contacted O-ring 42 and thus has acted as a plug to prevent fluid flow through passage 38.

Figure 3:
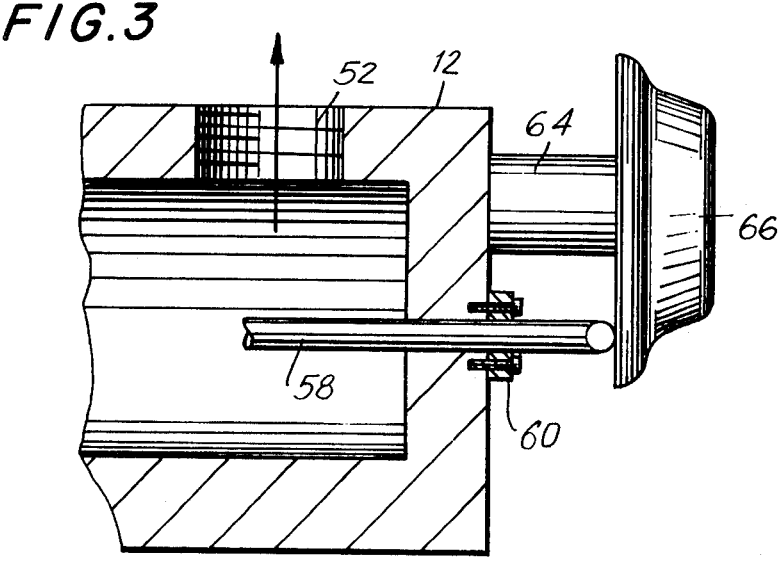
FIG. 3 shows a modified form of the present invention.

FIG. 3 shows mounting means 64 extending from section 12 to timer 66 which controls the extension or retraction of rod 58, depending on a desired time schedule or interval. Element 66 may optionally include or consist of a freeze-out spacer such as a thermostat, bimetallic strip or the like for the purposes mentioned supra.

Figure 4:
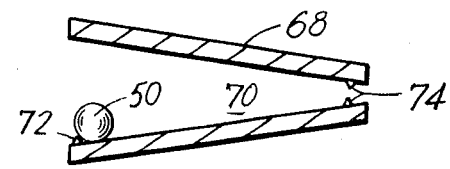
FIG. 4 illustrates an alternative form of channel with cooperating ball.

FIG. 4 shows an alternative embodiment of the invention in which a channel 68 is frusto-conical with a frusto-conical inner passage 70; a lower stop 72 is provided to retain ball 50 while upper lips 74 coact with ball 50 to seal against fluid flow when ball 50 moves laterally upwards through passage 70 due to differential fluid pressure.

To summarize the concept of the present invention, the purpose of this valve is to provide a means of allowing the water pressure to remain on in a dwelling, yet should a waterline break, it would sense a flow of water and shut off the supply immediately. There is a bypass system built in that would allow manual setting of a timer and thus to be able to use the water and then the valve would automatically shut down or revert to the failsafe system. In principle, it works like this: A steel ball 50 is set in a cone-shaped channel 70 or 38. As water moves through the channel, it pulls the ball 50 up the incline until it closes off the opening. The unequal water pressure keeps the ball in place. To reset, depress rod 58 and the water pressure is allowed to equalize, letting the ball 50 roll back leaving a clear channel. The rod 58 can be controlled by a timer 66, thereby holding the channel cone 36 in the open or bypass position so water can be used for a measured amount of time. When the timer releases the rod a spring 28 forces the channel cone closed and the system is activated again.

This valve is designed to be used in new home construction where it is necessary to turn the water on to test the lines for leaks and leave the system on and under pressure. Since the dwelling is unoccupied during construction, sometimes for long periods of time, this valve will reduce the extensive damage caused by a leak or line breakage. Once the dwelling is occupied, the valve can be removed or set in the bypass position. At this point, a freeze-out spacer can be installed at the end of rod 58. Should the heat fail in the home, then the spacer would break and allow the cone channel to reset the failsafe system.

Numerous alternatives within the scope of the present invention will occur to those skilled in the art. The valve is applicable to the control of any fluid, e.g. a gas such as air, natural gas, propane, nitrogen, oxygen, steam or the like, or a liquid such as water, liquid hydrocarbons such as gasoline, crude oil or naphtha, liquid foodstuffs such as vegetable oils, etc. The valve is also applicable in instances when the fluid is a gas containing entrained liquid droplets, or when the fluid contains entrained solid particles such as a slurry. In most instances, the valve housing member 14 will be cylindrical, and the inner surface of element 32 and the outer surface of channel elements 36 or 68 will be frusto-conical. Typically these frusto-conical surfaces will be coaxial with the housing. In the embodiment of FIG. 4 the passage 70 is frusto-conical; however, this passage may be of any suitable configuration having an upward incline in a downstream direction, e.g. the cylindrical passage 38 (FIGS. 1 and 2).

It thus will be seen that there is provided a fail-safe fluid control valve which achieves the various objects of the invention and which is well adapted to meet the conditions of practical use.

As various possible embodiments might be made of the above invention, and as various changes might be made in the embodiments above set forth, it is to be understood that all matter herein described or shown in the accompanying drawings is to be interpreted as illustrative and not in a limiting sense.

Having thus described the invention, there is claimed as new and desired to be secured by Letters Patent:

1. A failsafe fluid control valve comprising a hollow housing, a fluid inlet port at one end of said housing, a fluid outlet port at the other end of said housing, means to pass a fluid into said hollow housing through said inlet port, said housing having a central inner fluid flow control section, the inner surface of said central section converging in a downstream direction of fluid flow, a hollow channel, said channel being displaceably suspended within the central section of said housing, the outer surface of said channel converging in a downstream direction of fluid flow so that when said channel is displaced downstream, the outer surface of said channel mates with the inner surface of said central section to stop fluid flow, said hollow channel having an inner passage, said passage being inclined upwardly in a downstream direction, a substantially spherical ball, said ball being disposed in said passage, stop means at each end of said passage to prevent said ball from passing out of said passage, ball receiving means at the downstream end of said passage so that when said ball reaches said ball receiving means, fluid flow through said passage is terminated, the diameter of said ball being less than the height of said passage so that said ball may move freely upwards or downwards through said passage depending on differential pressure of fluid flow, a spring, said spring extending between said channel and the fluid inlet end of said housing, and a rod, said rod extending into the fluid outlet end of said housing to the downstream end of said channel, so that displacement of said rod moves said channel against the force of said spring.

2. The valve of claim 1 in which the fluid is water.

3. The valve of claim 1 in which the housing is cylindrical, and the inner surface of the central section and the outer surface of the channel are frusto-conical.

4. The valve of claim 3 in which the frusto-conical surfaces are coaxial with the housing.

5. The valve of claim 1 in which the passage is frusto-conical.

6. The valve of claim 1 in which the passage is cylindrical.

7. The valve of claim 6 in which the ball receiving means at the downstream end of the passage is a cylindrical chamber having a lateral opening, said chamber being mounted on the inner end of the rod.

8. The valve of claim 1 together with a timer, said timer being mounted on the housing at the fluid outlet end of the housing and being in contact with the outer end of the rod, so that the rod is controlled by said timer whereby the channel may be held in an open position for a measured length of time.

9. The valve of claim 1 in which the rod is provided with a freeze-out spacer so that low temperature will allow the rod to be displaced whereby the channel will be moved by the spring and fluid flow will be blocked by displacement of the ball to the ball receiving means.

* * * * *